(No Model.)
W. B. SILVERS.
SPRING TRACE HOLDER.
No. 432,250. Patented July 15, 1890.
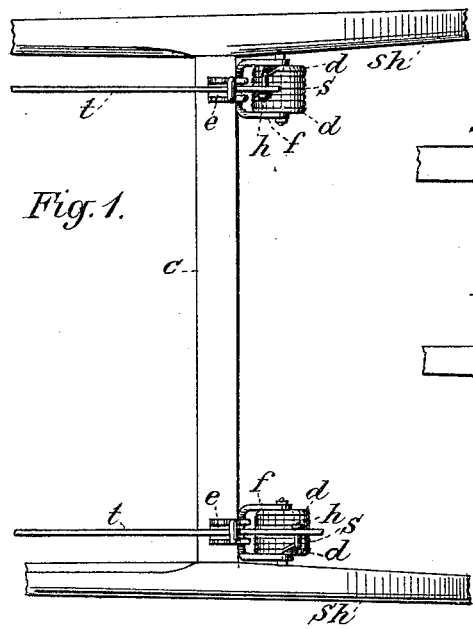
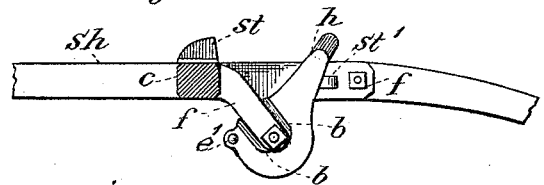
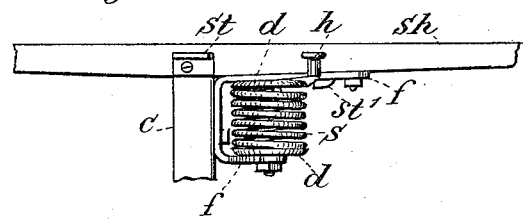
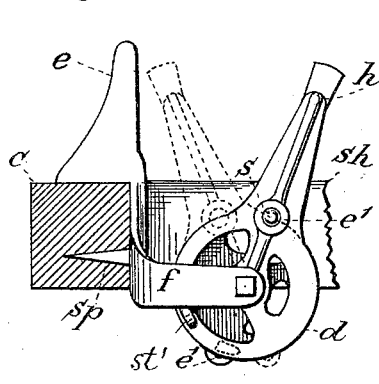
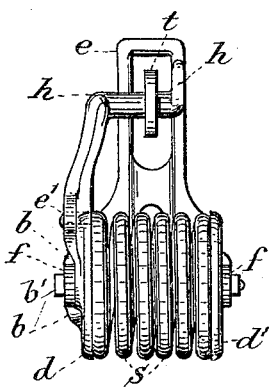
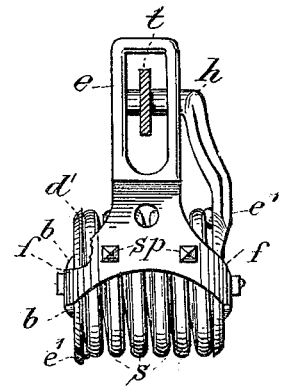
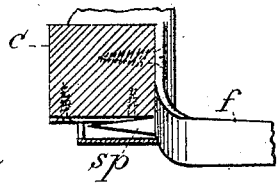
WITNESSES:
Gustav Bohn
E. B. Griffith
INVENTOR.
Walter B. Silvers.
By C. P. Jacobs
Atty.

UNITED STATES PATENT OFFICE.

WALTER B. SILVERS, OF INDIANAPOLIS, INDIANA, ASSIGNOR OF ONE-THIRD TO CHARLES W. BAGGERLY, OF SAME PLACE.

SPRING TRACE-HOLDER.

SPECIFICATION forming part of Letters Patent No. 432,250, dated July 15, 1890.

Application filed November 29, 1889. Serial No. 331,895. (No model.)

*To all whom it may concern:*

Be it known that I, WALTER B. SILVERS, of Indianapolis, county of Marion, and State of Indiana, have invented certain new and useful Improvements in Spring Trace-Holders; and I do hereby declare that the following is a full, clear, and exact description thereof, reference being had to the accompanying drawings, in which like letters refer to like parts.

My invention relates to the construction of spring trace-holders, and is an improvement on the invention for which Letters Patent No. 377,915 were issued to me on the 14th day of February, 1888, and will be understood from the following description.

In the drawings, Figure 1 represents a top view of my device connected to the cross-bar, the trace in place over the hook. Fig. 2 is a side view of a modified form of my device, the cross-bar being in section. Fig. 3 is a top view of the same. Fig. 4 is a side view of my device, showing one method of attachment to the cross-bar. Fig. 5 is a rear and Fig. 6 is a front view of the device. Fig. 7 shows another method of attachment to the cross-bar.

In detail my device consists of a frame-work $f$, having one or more spurs $sp$ connected to the front thereof, and a projection or eye $e$ at the top, which also serves as a guide, and through which the trace passes.

$h$ is the hook over which the trace is slipped, and has an upturned end or tang to keep the trace from coming off. This hook is formed integral with the disk $d$ of a reel or spool which is composed of this disk $d$ and a similar disk $d'$, connected together by a rod or bolt $b'$, and this bolt passes through the arms $f$ of the frame, so that the reel or spool is journaled in the frame and moves upon the bolt $b'$, which connects it to the frame. A spring $s$ is coiled about this spool between the disks, the ends of the spring being connected to the disks on each side through the eyes $e'$. Directly below the eye $e$ is a screw-hole, through which a screw is passed for securing the frame to the cross-bar of the shafts. The spikes $sp$ may be made to enter the shaft, as shown in Fig. 4, or passed directly beneath it, and in the latter case an iron strap will be fastened underneath the cross-bar to make a bearing for the spur, as shown in Fig. 7. The trace $t$ of the harness passes through the eye $e$, and extending backward is slipped over the tang of the hook $h$, and when the frame $f$ is firmly secured to the cross-bar pulling upon the trace will draw the hook forward into the position shown in the dotted lines in Fig. 4, and the eye $e$ will operate not only as a guide for the trace, but also as a stop for the hook, limiting its movement in that direction and preventing any undue strain upon the spring. The spring is coiled about the spool so that its tension will normally draw the hook back to the position shown in the full lines in Fig. 4, and this tension is constantly exerted against any pull upon the hook $h$. The connection of the trace to the vehicle is therefore always elastic and readily gives under any required strain, and no singletree is necessary.

In Figs. 2 and 3 a modified form of the device is shown, wherein the eye $e$ is removed and the short stop $st$ takes its place. The other parts of the device are substantially the same. The frame-work $f$ carries a spool, about which is coiled a spring, and a hook $h$ is connected to one disk. The ends of the spring are fastened in opposite disks, and the rod or bolt connecting the disks of the spool has bearings in the arms of the frame-work, and the device is connected to the cross-bar by a bolt, as shown in Fig. 3. $st'$ is a rear stop, which is used to limit the backward movement of the hook.

What I claim as my invention, and desire to secure by Letters Patent, is the following:

1. A spring trace-holder comprising a frame $f$, a spool having disks $d\ d'$, journaled in the frame, a spring $s$, coiled about such spool, a hook $h$, connected with one disk thereof, front and rear stops secured to the shafts and cross-bar, and the frame-work also connected to such cross-bar, substantially as shown and described.

2. A spring trace-holder comprising a frame-work fastened to the cross-bar of a vehicle, a spring coiled about a spool journaled in such frame-work, a hook connected thereto, the tension of the spring operating normally to throw the hook backward from the cross-bar, such trace-holder having a front stop *st*, connected therewith, formed into an eye *e*, through which the trace passes, all combined substantially as shown and described.

3. A spring trace-holder comprising a frame-work, a spool having a spring coiled about it and a hook connected with it journaled in such frame-work, all connected to the shafts or cross-bar of the vehicle, with front and rear stops, to limit the movement of the hook in either direction, fastened at suitable points upon the shaft or cross-bar, substantially as shown and described.

In witness whereof I have hereunto set my hand this 20th day of November, 1889.

WALTER B. SILVERS.

Witnesses:
 C. P. JACOBS,
 C. W. BAGGERLY.